E. M. ASHWORTH.
MAXIMUM DEMAND INDICATOR FOR ELECTRIC METERS.
APPLICATION FILED MAY 23, 1918.

1,323,518.

Patented Dec. 2, 1919.
2 SHEETS—SHEET 1.

Inventor.
E. M. Ashworth
by
H. S. Dennison
atty.

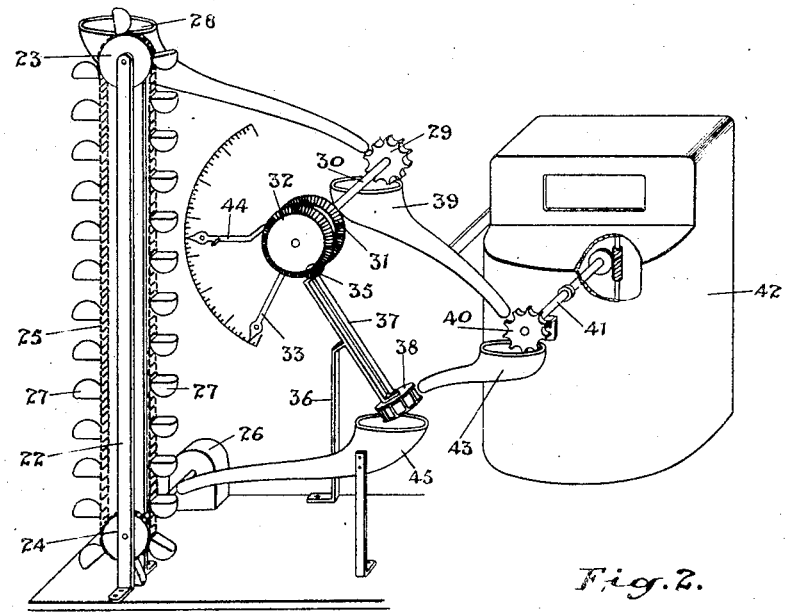

UNITED STATES PATENT OFFICE.

EDWARD M. ASHWORTH, OF TORONTO, ONTARIO, CANADA.

MAXIMUM-DEMAND INDICATOR FOR ELECTRIC METERS.

1,323,518.

Specification of Letters Patent.

Patented Dec. 2, 1919.

Application filed May 23, 1918. Serial No. 236,140.

*To all whom it may concern:*

Be it known that I, EDWARD M. ASHWORTH, a subject of the King of Great Britain, and resident of the city of Toronto, county of York, Province of Ontario, in the Dominion of Canada, have invented certain new and useful Improvements in Maximum-Demand Indicators for Electric Meters, as described in the following specification and illustrated in the accompanying drawings, that form part of the same.

The principal object of the invention is, to record the maximum demand or peak load of current used, thereby enabling the corporation supplying current to determine the proper rate of charge for current used.

It is well known that the actual kilowatt consumption of current may be used at a minimum demand, that is, a given amount of current used within a given time but if the maximum amount of current is utilized within a very short period the peak load is increased and it is necessary that the charge for service be regulated by this peak load as the plant for supplying the current at maximum peak loads involves heavy maintenance charges.

Numerous meters have been devised for measuring the integrated demand, that is, the average load for certain time intervals but it is well known that with such measurement the maximum actual demand may exceed the indicated maximum demand and no accurate indication is made of the peak load.

The present invention has been devised to effect an indication of the maximum demand during any interval predetermined length.

The principal feature of the invention consists in the delivery of indicating units by an integrating watt hour meter and providing means for indicating such delivery over intervals of definite length.

In the drawings, Figure 1 is a diagrammatic perspective view of an embodiment of one form of apparatus for carrying this invention into effect.

Fig. 2 is a perspective diagrammatic view illustrating a modified form of apparatus.

Fig. 3 is an elevational detail of a portion of the differential indicating mechanism illustrated in Fig. 2.

Figure 1:
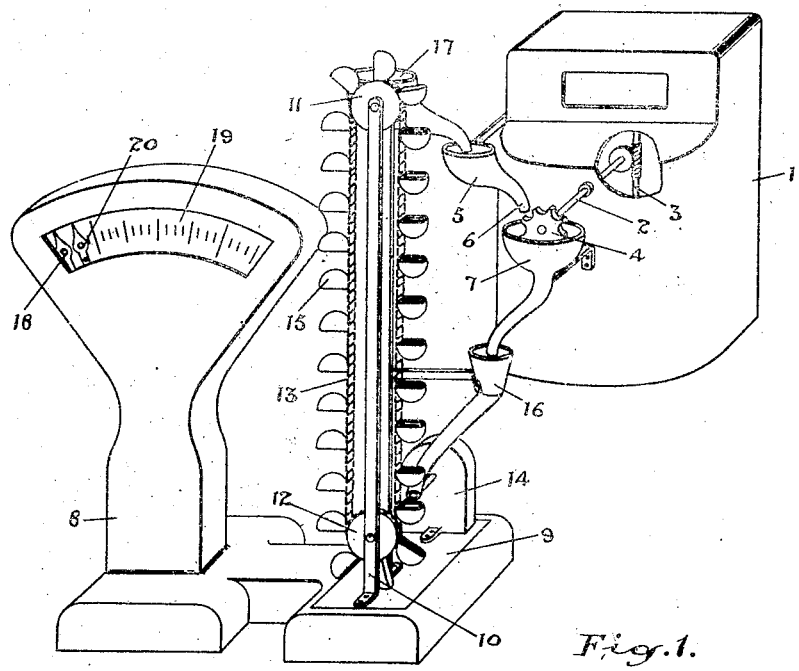

In the application of this invention in the form shown in Fig. 1 the meter 1 which is of the ordinary type for registering kilowatt hours is provided with an extension spindle 2 suitably geared to the meter spindle 3 and having on its outer end a pocket wheel 4.

A hopper or funnel 5 is supported from the meter casing above the wheel 4 and has its discharge end 6 arranged immediately over the wheel 4 so that as the said wheel rotates it will carry from the discharge end of the hopper, the indicating members which are preferably in the form of steel balls. These are taken from the hopper one at a time and discharged into a second hopper or funnel 7.

A weighing apparatus 8 is arranged adjacent to the meter and upon the scale platform 9 is supported an upright frame 10. The frame 10 carries a pair of wheels 11 and 12 arranged respectively at the top and bottom and these both support an endless belt 13. The lower wheel 12 is driven at a fixed speed by a clock mechanism 14 also arranged upon the platform 9.

Small buckets 15 are arranged upon the belt 13 at a uniform distance apart and a funnel member 16 rigidly supported from the frame 10 is arranged to receive the balls falling through the hopper 7 and to direct them into the buckets 15 as they pass the delivery end. The buckets carry the balls upwardly to the top and deliver them laterally into a receiving hopper 17 which conveys them to the hopper 5.

The clock mechanism 14 is arranged to rotate the belt 13 at a regulated speed which will be constant and will enable the definite indicating of the number of balls which have been directed into the buckets during a stated period. The belt supporting frame with the belt, clock mechanism and hoppers connected therewith are arranged upon the scale platform and counterbalanced so that the indicator 18 which swings over the dial 19 will rest at zero when there are no balls in the pockets. The weight of the balls is proportionate to the kilowatt hours and according to the speed of operation of the meter 1 the balls are counted out and delivered into the pockets of the endless belt. The maximum load or weight of balls that can be placed in these pockets within a given period of the movement of any one pocket from the bottom to the top will record upon the indicating dial the load for that definite period and the indicator 18 carries with it a secondary indicator 20. The primary indicating finger is balanced to return to normal but the secondary finger remains at the highest point of setting.

It will be readily understood that if for any definite period such as the time required for moving any one bucket from the bottom to the top position on the frame, the meter 1 operates at such a speed as to deliver the maximum quantity of balls to the successive pockets as they pass the hopper 16, the indicator will be operated by the weight of the entire quantity of balls in the pockets between the bottom and the top of the carrier and this will result in the maximum demand for that period of time being shown upon the indicator. Consequently at any period of the day the demand of power passing through the meter during any interval continues to load the buckets and an absolute indication of the maximum number of balls deposited will be made and the peak load will therefore be determined by glancing at the meter.

The result accomplished in this instance is through the actual measurement by weight of the balls counted out through the operation of the meter but the operation of the indicator may be effected through the operation of indicating members in the manner shown in Figs. 2 and 3, in which the balls counted out are used to operate the indicator directly. In this form a frame 22 supports the wheels 23 and 24 upon which is mounted an endless belt 25 operated by a clock 26. The balls are delivered from the bucket 27 at the top into a hopper 28. This hopper directs the balls into a pocket wheel 29 which is arranged upon a spindle 30 suitably supported but its supports are not here shown.

A beveled gear wheel 31 is secured upon the spindle 30 and a corresponding beveled gear 32 is rotatably supported on said spindle. The latter wheel is provided with a double face, the inner toothed face corresponding with the wheel 31.

An indicator arm 33 is rotatably mounted on the spindle 30 between the gears 31 and 32 and carries a rotatable beveled pinion 34 which meshes with the gear wheels 31 and 32. The outer toothed face of the gear wheel 32 meshes with a pinion 35 which is supported upon a frame 36 and is connected with its spindle 37 to a pocket wheel 38.

The hopper 39 forms a reservoir for the indicating balls and the use of current operating the meter rotates the spindle 41 and pocket wheel 40 which delivers balls from the hopper 39 into the hopper 43. The balls delivered to the hopper 43 are directed into the pocket wheel 38 which rotates the spindle 37 and through the pinion 35 operates the gear wheel 32 and as the gear 31 is stationary the pinion 34 carrying the indicating arm 33 moves the arm over the dial and carries with it the indicator arm 44 which is adapted to remain in whatever position to which it is moved by the movement of the arm 33. The balls after operating the pocket wheel 38 fall into the lower hopper 45 and are directed into the pockets of the endless belt operated by the clock 26. The balls are carried by the belt upwardly and delivered at the top into the hopper 28 from whence they are directed into the pocket wheel 29 to operate the spindle 30 and the gear 31 to effect the movement of the arm 33 in the opposite direction and to return the indicating arm toward zero.

The action thus effected through the differential mechanism records upon the dial the maximum number of balls liberated by the meter 42 during any interval in the operation of the machine, as the carrier is constantly operated at a uniform speed by the clock mechanism.

The general principle of indicating the operation of the wattmeter in both these forms of apparatus is the same, that is, the operation of the wattmeter regulates the indication by counting out the balls which after being so counted out are utilized to operate the indicating mechanism.

What I claim as my invention is:—

1. In a maximum demand indicator for electric meters, the combination with the watt hour meter, of means operated by said watt-hour meter for delivering indicating units, and means for indicating the delivery of such units in definite periods.

2. In a maximum demand indicator for electric meters, the combination with the watt hour meter, of means operated by said watt-hour meter for delivering indicating units, and means operated by the indicating units delivered by the watt-hour meter for operating indicator arms to show the maximum demand of current during a definite period.

3. In a maximum demand indicator for electric meters, the combination with the watt hour meter, a pocket wheel operatively connected with said watt-hour meter, means for delivering balls to said pocket wheel, means for conveying the balls from said pocket wheel, a time-controlled endless carrier adapted to receive the balls delivered from said pocket wheel, and means for indicating the number of balls conveyed to said time-controlled carrier during a definite interval.

4. In a maximum demand indicator for electric meters, the combination with a watt hour meter, of a scale balance indicating mechanism, a frame mounted upon said scale, an endless carrier mounted upon said frame, a clock mechanism rotating said endless carrier, and means operated by said watt-hour meter for delivering weighted balls to said endless carrier.

5. In a maximum demand indicator for electric meters, the combination with a watt hour meter having a pocket wheel rotatably connected therewith and operated by the operation of the meter, a hopper delivering indicating units to said pocket wheel, means for conveying said indicating units from said pocket wheel, an endless carrier having pockets adapted to receive the indicating units delivered from said pocket wheel, means for operating said endless carrier at a uniform speed, means for conveying the indicating units from said endless carrier at its point of delivery, and means for indicating the number of indicating units conveyed by said carrier during a definite interval.

E. M. ASHWORTH.